United States Patent
Dittrich et al.

(10) Patent No.: US 12,060,624 B2
(45) Date of Patent: Aug. 13, 2024

(54) METHOD FOR PRODUCING A PGM COLLECTOR ALLOY

(71) Applicant: Heraeus Deutschland Gmbh & Co. KG, Hanau (DE)

(72) Inventors: Regina Dittrich, Hanau (DE); Bernhard Bauer-Siebenlist, Aschaffenburg (DE); Holger Winkler, Darmstadt (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 527 days.

(21) Appl. No.: 17/433,552

(22) PCT Filed: Jan. 16, 2020

(86) PCT No.: PCT/EP2020/050976
§ 371 (c)(1),
(2) Date: Aug. 24, 2021

(87) PCT Pub. No.: WO2020/192977
PCT Pub. Date: Oct. 1, 2020

(65) Prior Publication Data
US 2022/0154306 A1    May 19, 2022

(30) Foreign Application Priority Data
Mar. 26, 2019    (EP) .................................... 19165155

(51) Int. Cl.
*C22B 11/02* (2006.01)
*C22B 7/00* (2006.01)
*C22B 9/10* (2006.01)

(52) U.S. Cl.
CPC ............ *C22B 11/026* (2013.01); *C22B 7/004* (2013.01); *C22B 9/10* (2013.01)

(58) Field of Classification Search
CPC ......... C22B 11/026; C22B 5/10; C22B 7/004; C22B 9/10
See application file for complete search history.

(56) References Cited

U.S. PATENT DOCUMENTS

| | | | |
|---|---|---|---|
| 3,963,644 A * | 6/1976 | Hansford | C10G 47/20 502/64 |
| 4,892,631 A | 1/1990 | White | |
| 7,473,406 B2 | 1/2009 | Jasra et al. | |
| 9,169,536 B2 | 10/2015 | Zimmermann et al. | |
| 10,202,669 B2 | 2/2019 | Ritschel et al. | |
| 10,323,302 B2 | 6/2019 | Stoffner et al. | |

FOREIGN PATENT DOCUMENTS

| | | | |
|---|---|---|---|
| EP | 2666876 A1 | | 11/2013 |
| JP | 2014224281 A | | 12/2014 |
| JP | 2018145479 | * | 9/2018 |
| KR | 100436448 | * | 6/2004 |
| TW | 201311910 A | | 3/2013 |
| TW | 201708548 A | | 3/2017 |
| TW | 201823478 A | | 7/2018 |
| WO | 2018006433 A1 | | 1/2018 |

OTHER PUBLICATIONS

Peng, Z. et al. "Pyrometallurgical recovery of platinum group metals from spent catalysts." 2017. JOM. 69. 9. p. 1553-1562 (Year: 2017).*
Dong, et al., Recovery of Platinum Group Metals From Spent Catalysts: a Review, International Journal of Mineral Processing, 2015, 145:108-113.
International Search Report issued in PCT/EP2020/050976 on Feb. 13, 2020.
"English translation of Office Action received in Taiwan Patent Application No. 108147346 Jul. 10, 2020".

* cited by examiner

*Primary Examiner* — Nicholas A Wang
(74) *Attorney, Agent, or Firm* — Blank Rome LLP

(57) ABSTRACT

A method for producing a PGM collector alloy comprising the steps of:
(1) providing (a) copper and/or silver, (b) material, which is to be processed melt-metallurgically, in the form of at least one sodium and/or potassium aluminosilicate support equipped with at least one PGM, and (c) at least one compound selected from the group consisting of iron oxides, calcium oxide, magnesium oxide, calcium carbonate, magnesium carbonate, sodium carbonate, and potassium carbonate,
(2) joint melting of the materials provided in step (1) at a temperature in the range of 1250 to <1450° C. by maintaining a 100:40 to 100:20 weight ratio of the materials provided in sub-steps (1b) and (1c), and a 35:65 to 80:20 weight ratio of copper and/or silver: PGM by forming a melt comprising two phases of different density,
(3) separating the upper phase of low density of molten slag from the lower phase of high density of molten PGM collector alloy by utilizing the density difference,
(4) allowing the melting phases separated from one another to cool down and solidify, and
(5) collecting the solidified PGM collector alloy.

17 Claims, No Drawings

METHOD FOR PRODUCING A PGM COLLECTOR ALLOY

This application is a national stage of International Patent Application No. PCT/EP2020/050976, filed Jan. 16, 2020, which the claims the benefit of European Application No. EP 19165155, filed Mar. 26, 2019, the entire contents of which are incorporated by reference herein.

The invention relates to a method for producing a PGM collector alloy, which comprises copper and/or silver.

The abbreviation "PGM" used in the present disclosure stands for platinum group metal selected from the group consisting of platinum, palladium, and rhodium.

The method according to the invention for producing a PGM collector alloy in particular takes place in the course of a melt-metallurgical process for processing PGM-containing sodium and/or potassium aluminosilicate supports, specifically PGM-containing heterogenous catalysts with sodium and/or potassium aluminosilicate support. "Melt-metallurgical processing" thereby refers to the recovery of PGM in a melt-metallurgical way.

The term "sodium and/or potassium aluminosilicate support" is used herein. This refers to sodium and/or potassium aluminosilicate support materials with a melting and optionally decomposition temperature in the range of above 1500° C., for example in the range of >1500° to 1750° C. The expression "melting and optionally decomposition temperature" used in this context can mean: melting point with decomposition, melting point without decomposition, melting range with decomposition, melting range without decomposition. Examples for sodium and/or potassium aluminosilicate supports in terms of the present disclosure comprise such zeolites, such as, for example zeolite A. The sodium and/or potassium aluminosilicate supports can comprise hydration water.

PGM-containing heterogenous catalysts are catalyst supports (in short also simply referred to as supports), to which one or a plurality of PGM are applied as catalytically active species (with catalyst supports loaded with one PGM or a plurality of PGMs). The PGM or PGMs can thereby be present on the support in elementary metallic form and/or as PGM compound, in particular as PGM oxide. The PGM content (the PGM loading) of PGM-containing heterogenous catalysts can lie in the range of, for example, 0.01 to 10% by weight, based on PGM-loaded catalyst supports.

PGM-containing heterogenous catalysts can originate from a large variety of sources. Examples comprise exhaust air purification catalysts, exhaust gas purification catalysts, catalysts used for producing clean gas, and process catalysts, for example from the chemical, pharmaceutical, and petrochemical industry.

Due to high PGM prices, a use of PGM-containing heterogenous catalysts is often only economical when the PGM can be recovered from depleted PGM-containing heterogenous catalysts. Depleted PGM-containing heterogenous catalysts are PGM-containing heterogenous catalysts, the catalytic activity of which has diminished during their use.

PGM-containing heterogenous catalysts with suitability for the melt-metallurgical processing can in particular be present in the form of PGM-containing refractory support material. The refractory support material can be present in the form of molds, such as, for example, strands, cylinders, pellets, rings, multi-hole rings, spheres, caliper bodies, wheels, chairs, cuboids, platelets, foam bodies or honeycombs. The molds can have diameters or sizes in the range of, for example, 0.1 to 30 millimeters. Such molds are often porous.

A refractory support material is a high-melting inorganic non-metallic material, which is comparatively resistant at high temperatures. It can be, for example, ceramic refractory material. Examples for refractory materials comprise aluminum oxide, titanium dioxide, silicon dioxide, magnesium oxide, zirconium oxide, mixed oxides, such as cerium/zirconium mixed oxides, silicates, titanates, silicon carbide, and silicon nitride. The above-mentioned sodium aluminosilicates and potassium aluminosilicates are also refractory material. The refractory materials as such are inherently free from precious metal or from PGM, respectively.

The person of skill in the art understands the term "free from precious metal" or "free from PGM" used herein as free from precious metal or free from PGM, respectively, except for a low precious metal or PGM content, respectively, which is virtually unavoidable from a technical aspect, for example, in the range of between >0 and 25 ppm by weight.

In the case of the melt-metallurgical processing of PGM-containing heterogenous catalysts, the latter can initially be ground into powder, if necessary, and can then be separated melt-metallurgically into PGM and refractory material. During the melt-metallurgical treatment, the separation of the PGM or of the PGMs takes place by melting the heterogeneous catalyst in a melting furnace. Collector metal, such as, for example, iron, nickel, lead or tin is usually added to the material in the melting furnace. Slag forming agents can optionally also be added. The portion of the refractory material is transferred into a slag phase in the course of the melting process, while the PGM or PGMs is/are bound in the collector metal by forming a PGM collector alloy. The molten slag and the molten PGM collector alloy form a two-phase system, which allows for a phase separation due to the density difference. The PGM concentration in the PGM collector alloy is significantly higher than in the heterogenous catalyst starting material, and subsequently allows for an economic representation of the PGM or of the PGMs as metal or as PGM compound after corresponding processing of the PGM collector alloy.

As already mentioned above, the present invention can relate to the production of a PGM collector alloy, in particular in the context of a melt-metallurgical method, for processing PGM-containing heterogenous catalysts, concretely such PGM-containing heterogenous catalysts with sodium and/or potassium aluminosilicate support.

The PGM-containing heterogenous catalysts with sodium and/or potassium aluminosilicate support are thus heterogeneous catalysts in the form of supports of sodium and/or potassium aluminosilicate equipped with one PGM or a plurality of PGMs.

Together with PGM-containing heterogenous catalysts on the basis of other refractory support materials (refractory supports other than sodium and/or potassium aluminosilicate supports), PGM-containing heterogenous catalysts with sodium and/or potassium aluminosilicate support can be processed melt-metallurgically.

PGM-containing heterogenous catalysts with sodium and/or potassium aluminosilicate support, however, entail special challenges, as soon as they are to be processed at least essentially homogeneously in a melt-metallurgical manner, for example, with a portion of PGM-containing heterogeneous catalysts with sodium and/or potassium aluminosilicate support of >70 to <100% by weight or preferably >80 to <100% by weight, based on a mixture of PGM-containing heterogenous catalysts, which are to be processed melt-metallurgically. In contrast to "essentially homogeneously", "completely homogenously" means operating with a portion of PGM-containing heterogenous catalysts with sodium and/or potassium aluminosilicate support of 100% by weight, based on PGM-containing heterogenous catalyst, which is to be processed melt-metallurgically or a mixture of PGM-containing heterogenous catalysts, which are to be processed melt-metallurgically, respectively, thus working with a uniform type of PGM-containing heterogenous catalyst with sodium and/or potassium aluminosilicate support (with the same sodium and/or potassium aluminosilicate support with identical or different PGM equipment) or with a plurality of different types of PGM-containing heterogenous catalysts with sodium and/or potassium aluminosilicate support, respectively (with different sodium and/or potassium aluminosilicate supports with identical or different PGM equipment).

The completely homogenous or the essentially homogeneous melt-metallurgical processing of PGM-containing heterogenous catalysts with sodium and/or potassium aluminosilicate support requires the use of very high melting temperatures, for example in the range of >1500 to 1750° C. This is associated with a very high energy consumption. In the case of these high melting temperatures, sodium and/or potassium oxide, i.e. sodium and/or potassium oxide originating from the sodium and/or potassium aluminosilicate, are volatile and can lead to deposits in the exhaust gas system after escaping from the melt, even to a dangerous clogging of the exhaust gas system of the used melting furnace. In the case of such high temperatures, a fireproof lining of the used melting furnace can furthermore be attacked by the alkaline sodium and/or potassium oxide.

The applicant was able to develop a method, which does not only allow for the essentially homogenous, but also for the completely homogenous melt-metallurgical processing of PGM-containing sodium and/or potassium aluminosilicate supports or of PGM-containing heterogenous catalysts with sodium and/or potassium aluminosilicate support, respectively, at comparatively low temperatures of <1450° C.

The invention consists of a method for producing a PGM collector alloy. The method comprises the steps of:
(1) providing (a) copper and/or silver, (b) material, which is to be or can be processed melt-metallurgically, respectively, in the form of at least one sodium and/or potassium aluminosilicate support equipped with at least one PGM, and (c) at least one compound selected from the group consisting of iron oxides, calcium oxide, magnesium oxide, calcium carbonate, magnesium carbonate, sodium carbonate, and potassium carbonate, (2) joint melting of the materials provided in step (1) at a temperature in the range of 1250 to <1450° C. by maintaining a 100:40 to 100:20 weight ratio of the materials provided in sub-steps (1b) and (1c), and a 35:65 to 80:20 weight ratio of copper and/or silver: PGM (in particular the at least one PGM) by forming a melt comprising two phases of different density,
(3) separating the upper phase of low density of molten slag from the lower phase of high density of molten PGM collector alloy by utilizing the density difference,
(4) allowing the melting phases separated from one another to cool down and solidify, and
(5) collecting the solidified PGM collector alloy.

The PGM collector alloy forming during step (2) in the method according to the invention thus comprises 35 to 80% by weight of copper and/or silver, and 65 to 20% by weight of the at least one PGM; it can thereby comprise, for example, up to 30% by weight of one or a plurality of other elements (elements other than copper, silver and the at least one PGM). It preferably consists of 35 to 80% by weight of copper and/or silver and of 65 to 20% by weight of the at least one PGM.

If the material, which is to be or can be processed melt-metallurgically, respectively, provided in sub-step (1b) is a PGM-containing heterogenous catalyst with sodium and/or potassium aluminosilicate support, for example a residual amount or a faulty batch or a depleted catalyst of this type, the invention can also be understood as a method for processing a PGM-containing heterogenous catalyst with sodium and/or potassium aluminosilicate support. In this case, the method comprises the steps of:
(1) providing (a) copper and/or silver, (b) at least one PGM-containing heterogeneous catalyst in the form of a sodium and/or potassium aluminosilicate support equipped with at least one PGM, and (c) at least one compound selected from the group consisting of iron oxides, calcium oxide, magnesium oxide, calcium carbonate, magnesium carbonate, sodium carbonate, and potassium carbonate,
(2) joint melting of the materials provided in step (1) at a temperature in the range of 1250 to <1450° C. by maintaining a 100:40 to 100:20 weight ratio of the materials provided in sub-steps (1b) and (1c), and a 35:65 to 80:20 weight ratio of copper and/or silver: PGM (the at least one PGM) by forming a melt comprising two phases of different density,
(3) separating the upper phase of low density of molten slag from the lower phase of high density of molten PGM collector alloy by utilizing the density difference,
(4) allowing the melting phases separated from one another to cool down and solidify, and
(5) collecting the solidified PGM collector alloy.

Copper and/or silver are provided in sub-step (1a) of the method according to the invention. The copper and/or silver thereby serve as collector metal(s) or, more precisely, at least as the essential collector metal(s) with a percentage by weight of, for example >60% by weight of the total amount of all collector metals used in the method according to the invention. The copper and/or silver in particular serve as the only collector metal(s) for the at least one PGM and, together with it, form a molten PGM collector alloy as lower melting phase with high density during step (2). In other words, the copper and/or silver are added or used, respectively, as the essential collector metal(s), in particular as the only collector metal(s) in step (2).

Material, which is to be or can be processed melt-metallurgically, respectively, in the form of at least one sodium and/or potassium aluminosilicate support equipped with at least one PGM, is provided in sub-step (1b) of the method according to the invention. This is generally a PGM-containing heterogenous catalyst with sodium and/or potassium aluminosilicate support, in particular depleted PGM-containing heterogenous catalyst with sodium and/or potassium aluminosilicate support. Depleted PGM-containing heterogenous catalyst with sodium and/or potassium aluminosilicate support can contain small quantities of, for example >0 to 5% by weight of further substances (substances other than PGM and sodium and/or potassium aluminosilicate support), in particular impurities, such as, for example, organic compounds and/or carbon. If desired, such substances can be removed prior to performing step (2).

The PGM content of the material provided in sub-step (1b) can lie, for example, in the range of 0.01 to 10% by weight or 0.01 to 5% by weight or preferably in the range of 0.1 and 5% by weight. If the PGM content is not known, it can be determined by the person of skill in the art with conventional analysis methods, for example, by using ICP-OES (inductively coupled plasma optical emission spectrometry).

At least one compound selected from the group consisting of iron oxides, calcium oxide, magnesium oxide, calcium carbonate, magnesium carbonate, sodium carbonate, and potassium carbonate is provided in sub-step (1c) of the method according to the invention. The oxides, in particular calcium oxide and iron oxides, are preferred here. The at least one compound can serve as alkaline fluxing agent during step (2) and, together with the sodium and/or potassium aluminosilicate support material, forms a molten slag as upper melting phase with low density during step (2).

Reducing agent, such as, for example, propane, but in particular solid reducing agent in the form of coke, graphite and/or plastic (plastic residues, plastic recyclate) can be provided in an optional sub-step (1d). This is in particular advantageous, for example, if the material provided in sub-step (1b) comprises PGM oxide. The reducing agent can be supplied or added in step (2). PGM oxide can thus be reduced to the elementary metallic PGM, and the latter can thus be made accessible for the formation of a collector alloy with the copper and/or silver provided in sub-step (1a) as well as optionally of a collector metal, which differs therefrom, used in the method.

If no material is used, which is to be processed melt-metallurgically, other than the material provided in sub-step (1b), thus only the material provided in sub-step (1b), is used in step (2), this is a melt-metallurgical processing of the material provided in sub-step (1b), which is completely homogenous in the above-mentioned sense.

If the method according to the invention is a method for the only essentially homogenous melt-metallurgical processing of PGM-containing sodium and/or aluminosilicate support or PGM-containing heterogenous catalyst with sodium and/or potassium aluminosilicate support, at least one material, which is to be processed melt-metallurgically, other than the material provided in sub-step (1b) is provided in a sub-step (1e), for example, in a quantity of >0 to <30% by weight, preferably >0 to <20% by weight, based on the sum (total quantity) of the materials, which are to be melt-metallurgically processed as provided in sub-steps (1b) and (1e). A material, which is to be melt-metallurgically processed, other than the material provided in sub-step (1b) can thus in particular be a PGM-containing heterogenous catalyst on the basis of refractory support materials other than sodium and/or potassium aluminosilicate (PGM-containing heterogenous catalyst with sodium and/or potassium aluminosilicate support). Such a material, which is to be melt-metallurgically processed, other than the material provided in sub-step (1b), is processed, i.e. melted, in step (2), together with the material provided in sub-step (1b).

The PGM content of a material provided in a sub-step (1e) can lie, for example, in the range of 0.01 to 10% by weight or 0.01 to 5% by weight or preferably in the range of 0.1 to 5% by weight. If the PGM content is not known, it can be determined by the person of skill in the art with conventional analysis methods, for example, by using ICP-OES.

All of the solid materials provided in the sub-steps (1a) to (1c) as well as in the respective optional sub-steps (1d) and (1e) are preferably already present in a comminuted manner or they can advantageously be comminuted prior to their use in step (2). The person of skill in the art will thereby keep an eye on a good manageability and will avoid, for example, a comminution, which leads to dust problems.

The materials provided in the sub-steps (1a) to (1c) as well as optionally in (1d) and optionally in (1e) are melted together in step (2) of the method according to the invention, at a temperature in the range of 1250 to <1450° C. by maintaining a 100:40 to 100:20 weight ratio of the materials provided in sub-steps (1b) and (1c), and of a 35:65 to 80:20 weight ratio of copper and/or silver: PGM. A melt comprising or consisting of two phases of different density is formed thereby, namely an upper phase of molten slag and a lower phase of molten PGM collector alloy. In the case of the method according to the invention, work is preferably performed in such a way that the two phases form at a ratio, which adds up to 100 parts by weight, in the range of, for example, 10 to 80 parts by weight, preferably 30 to 80 parts by weight of PGM collector alloy: 20 to 90 parts by weight, preferably 20 to 70 parts by weight of slag.

With the knowledge of the respective PGM content of the material or materials, which is/are to be provided or which is/are already provided, respectively, in sub-steps (1b) as well as optionally (1e), and in consideration of the 100:40 to 100:20 weight ratio, which is to be maintained, of the materials, which are to be provided or which are provided, respectively, in sub-steps (1b) and (1c), and of the 35:65 to 80:20 weight ratio, which is also to be maintained, of copper and/or silver: PGM, the person of skill in the art selects the quantity of materials, which are to be provided or which are provided, respectively, in step (1); for the selection, the person of skill in the art preferably also considers that a ratio, which adds up to 100 parts by weight, in the range of 10 to 80 parts by weight, preferably 30 to 80 parts by weight of PGM collector alloy: 20 to 90 parts by weight, preferably 20 to 70 parts by weight of slag can form.

In advantageous embodiments of the method according to the invention, only the materials provided in sub-steps (1a) to (1c) as well as in each case optionally in (1d) and/or (1e) are provided in step (2). The method according to the invention can thereby comprise or consist of the following sub-steps or steps, respectively:

(1a) to (1c) plus (1d) plus (2) to (5), or
(1a) to (1c) plus (1e) plus (2) to (5), or
(1a) to (1c) plus (2) to (5).

Embodiments without sub-step (1e), i.e. embodiments of the above-mentioned completely homogenous processing, are preferred.

The melting process can be performed in a conventional, for example, gas-fired, melting furnace. It is preferably a melting furnace comprising alkali-resistant internal lining, for example, of chrome corundum. In general, work is performed under reducing furnace atmosphere.

It is possible to mix the materials provided in step (1) and to then add them into the hot melting furnace in portions or separately in portions, for example, alternately in portions. It is preferred, however, to initially add the materials provided in sub-steps (1b) and (1c) as well as optionally in sub-step (1e) into the hot melting furnace either mixed or separately in portions, for example, alternately in portions, and to melt them, before the copper and/or silver provided in sub-step (1a) is then added to the melt in portions. Addition in portions means that the portion size and adding frequency depends on the progress of the melting process, so that the adding into the melt takes place in order to ensure a good heat transfer into the melting material.

A second phase of melt of a different density is formed during the melting process in step (2), whereby PGM separates from sodium and/or potassium aluminosilicate. In response to the realization of sub-step (1e), PGM and refractory support material other than sodium and/or potassium aluminosilicate also separate. The PGM alloys with the copper and/or silver, which acts as collector metal(s) as well as optionally with further collector metals differing therefrom, which are used in the method, to form a PGM collector alloy, and collects in the lower area of the melting furnace due to the high density, which lies, for example, in the range of 10 to 15 g/cm$^3$. The sodium and/or potassium aluminosilicate mixes with the at least one compound provided in sub-step (1c) a well as with the refractory support material originating from the material optionally provided in sub-step (1e) by forming a slag, which collects in the upper area of the melting furnace, with a lower density, which lies in the range of, for example, 2.5 to 4 g/cm$^3$. To avoid misunderstandings, the density information refers to the respective solid material at 20° C. The molten slag swims on the PGM collector alloy, which is also molten, i.e. a liquid two-phase system of two melting phases arranged on top of one another, forms.

The molten slag is essentially the result of the melt-down of the sodium and/or potassium aluminosilicate from the material provided in sub-step (1b) with the at least one compound provided in sub-step (1c) as well as optionally with refractory support material from a material provided in a possible sub-step (1e). The molten slag can thereby be a chemically unchanged mixture of said substances or can have experienced a chemical change, for example, as a result of a separation of carbon dioxide from carbonate.

In particular the following feature combination appears to be essential for the success of step (2) at 1250 to <1450° C.:
(i) providing copper and/or silver as collector metal(s) according to sub-step (1a)
(ii) providing at least one compound selected from the group consisting of iron oxides, calcium oxide, magnesium oxide, calcium carbonate, magnesium carbonate, sodium carbonate, and potassium carbonate according to sub-step (1c),
(iii) maintaining a 100:40 to 100:20 weight ratio of the materials provided in sub-steps (1b) and (1c), and
(iv) maintaining a 35:65 to 80:20 weight ratio of copper and/or silver: PGM.

Upon conclusion of step (2), i.e. after the two-phase system has formed, step (3) of the method according to the invention is performed, namely the separation of the upper phase of lower density of molten slag from the lower phase of high density of molten PGM collector alloy by utilizing the density difference. For this purpose, the content of the melting furnace can, for example, be poured out carefully according to the known decanting principle or the molten slag phase or the PGM collector alloy phase is poured.

The molten PGM collector alloy, which forms the lower phase, can be poured, for example, into suitable containers and can cool down in subsequent step (4) and can thereby be allowed to solidify.

After cool-down and solidification of the PGM collector alloy during step (4), the latter can be collected in step (5). The PGM collector alloy can then be subjected to a further conventional refining, e.g. an electrometallurgical and/or hydrometallurgical refining, so as to thus finally obtain the PGM or the individual PGMs either as metal or as PGM compound or, for example, as solution thereof.

The invention claimed is:

1. A method for producing a platinum group metal (PGM) collector alloy comprising the steps of:
   (1) providing (a) copper and/or silver, (b) a material, which is to be processed melt-metallurgically, in the form of at least one sodium aluminosilicate support and/or potassium aluminosilicate support equipped with at least one PGM, and (c) at least one compound selected from the group consisting of iron oxides, calcium oxide, magnesium oxide, calcium carbonate, magnesium carbonate, sodium carbonate, and potassium carbonate,
   (2) joint melting of the materials provided in step (1) at a temperature in the range of 1250 to <1450° C. by maintaining a 100:40 to 100:20 weight ratio of the materials provided in sub-steps (1b) and (1c), and a 35:65 to 80:20 weight ratio of copper and/or silver: PGM by forming a melt comprising two phases of different density,
   (3) separating the two phases, the two phases being a first upper phase of molten slag from a second lower phase of molten PGM collector alloy, by utilizing the density difference therebetween where the density of the first upper phase is lower than the density of the second lower phase,
   (4) allowing the separated upper and lower phases to cool down and solidify, and
   (5) collecting the solidified PGM collector alloy.

2. The method of claim 1, wherein the material, which is to be processed melt-metallurgically, provided in sub-step (1b) is a PGM-containing heterogenous catalyst with the at least one sodium aluminosilicate support and/or potassium aluminosilicate support.

3. The method of claim 2, wherein the PGM content of the material provided in sub-step (1b) lies in the range of 0.01 to 10% by weight.

4. The method of claim 2, wherein a reducing agent is provided in a sub-step (1d) and is added in step (2).

5. The method of claim 2, wherein at least one material, which is to be melt-metallurgically processed, other than the material provided in sub-step (1b), is provided in a sub-step (1e), and is melted in step (2) together with the material provided in sub-step (1b).

6. The method claim 2, wherein the two phases form at a ratio, which adds up to 100 parts by weight, in the range of 10 to 80 parts by weight of PGM collector alloy: 20 to 90 parts by weight of slag.

7. The method of claim 1, wherein the PGM content of the material provided in sub-step (1b) lies in the range of 0.01 to 10% by weight.

8. The method of claim 7, wherein a reducing agent is provided in a sub-step (1d) and is added in step (2).

9. The method of claim 7, wherein at least one material, which is to be melt-metallurgically processed, other than the material provided in sub-step (1b), is provided in a sub-step (1e), and is melted in step (2) together with the material provided in sub-step (1b).

10. The method claim 7, wherein the two phases form at a ratio, which adds up to 100 parts by weight, in the range of 10 to 80 parts by weight of PGM collector alloy: 20 to 90 parts by weight of slag.

11. The method of claim 1, wherein a reducing agent is provided in a sub-step (1d) and is added in step (2).

12. The method of claim 11, wherein at least one material, which is to be melt-metallurgically processed, other than the material provided in sub-step (1b), is provided in a sub-step (1e), and is melted in step (2) together with the material provided in sub-step (1b).

13. The method claim 11, wherein the two phases form at a ratio, which adds up to 100 parts by weight, in the range of 10 to 80 parts by weight of PGM collector alloy: 20 to 90 parts by weight of slag.

14. The method of claim 1, wherein at least one material, which is to be melt-metallurgically processed, other than the material provided in sub-step (1b), is provided in a sub-step (1e), and is melted in step (2) together with the material provided in sub-step (1b).

15. The method of claim 14, wherein the material provided in sub-step (1e) accounts for a quantity of >0 to <30% by weight, based on the sum of the materials, which are to be melt-metallurgically processed, provided in sub-steps (1b) and (1e).

16. The method claim 1, wherein the two phases form at a ratio, which adds up to 100 parts by weight, in the range of 10 to 80 parts by weight of PGM collector alloy: 20 to 90 parts by weight of slag.

17. The method of claim 1, wherein the material provided in sub-step (1b) is completely homogeneously processed melt-metallurgically.

* * * * *